3,506,496
ALKALINE ELECTROCHEMICAL CELLS AND METHOD OF MAKING

Howard Eugene Hoyt and Helmuth Louis Pfluger, Huntingdon Valley, Pa., assignors to Borden, Inc., a corporation of New Jersey
No Drawing. Filed Aug. 8, 1967, Ser. No. 658,999
Int. Cl. H01m 3/00
U.S. Cl. 136—148                    10 Claims

ABSTRACT OF THE DISCLOSURE

This invention relates to equilibrated cellulose ether membranes of increased electrolytic conductivity for use as separators in concentrated alkaline electrochemical cells and to the method of making such membranes by equilibration to the degree desired in an aqueous alkali solution maintained at a temperature below about 10° C.

ORIGIN OF THE INVENTION

The invention described herein was made in the performance of work under NASA contract and is subject to the provisions of Section 305 of the National Aeronautics and Space Act of 1958, Public Law 85–568 (72 Stat. 435; 42 U.S.C. 2457).

BACKGROUND OF THE INVENTION

It is known that the cycle life of rechargeable electrochemical cells such as batteries, is limited by the tendency of the electrodes to short circuit and that this tendency can be slowed down by the use of a separator membrane placed between the electrodes. In the particular case of alkaline silver-metal cells such a separator must also withstand the oxidizing power of silver oxide and the penetration of metallic ions, and must have low resistance to the passage of an electrolytic current. Films of cellulose ethers, particularly methyl cellulose, have excellent withstanding powers against both silver oxidation and metal ion penetration, but not the low electrolytic resistance required; particularly in the 30% to 45% potassium hydroxide solutions customarily required for efficient operation of silver-zinc, silver-cadmium cells and other like silver cells.

SUMMARY OF THE INVENTION

Cellulose ether membranes have now been found having a high electrolytic conductivity in concentrated alkaline battery solutions and which are used to provide electrochemical cells with extended life and superior performance. Moreover, it has surprisingly been found that the electrolytic resistance of the membranes remains low for indefinite periods of time.

Briefly stated, the present invention comprises the method of increasing the electrolytic conductivity of cellulose ether membranes by contacting said membranes with a concentrated alkali solution at a temperature below about 10° C. for a time sufficient to equilibrate the membrane to the level of electrolytic conductivity required and to the resulting product and electrochemical cells utilizing said membranes.

DETAILED DESCRIPTION

As to materials, the cellulose ether used may be any water-soluble or water-swellable cellulose ether which is also alkali-insoluble, such as methyl cellulose, ethyl cellulose, propyl cellulose, or the like.

The preferred ether is methyl cellulose, particularly methyl cellulose in which 1.6 to 1.9 out of every 3.0 available hydroxyl units of cellulose have been etherified. Methods for etherifying cellulose to different degrees and using a variety of ether groups are well-known to the art and are not a subject of the instant invention.

The film, or membrane, to be treated may also contain a minor proportion of a modifying agent to help increase conductivity and/or increase flexibility. Examples are hydroxide bases of inorganic or organic cations, organic nitrogen bases, salts of organic acids, glycols, and polymeric acids.

Examples of hydroxide bases are potassium hydroxide, sodium hydroxide and tetramethylammonium hydroxide. Organic nitrogen bases that can be used include aliphatic primary, secondary and tertiary amines and hydroxy amines, in particular hydroxypropylamine and triethanolamine. Suitable salts of organic acids are the alkali metal salts of acetic, propionic, butyric, salicyclic, succinic, glutaric, maleic, and fumaric acids. Potassium salts are preferred when the cell electrolyte is to be potassium hydroxide. The glycol used can be, for example glycerine, ethylene glycol, tetraethylene glycol, and the polyethylene glycols. As to polymeric acids, polyacrylic acid, such as Acrysol A5, and the 1:1 copolymer of vinyl methyl ether and maleic anhydride, such as Gantrez AN can be used.

The minor proportion of compatible polar component must be in intimate admixture with the cellulose ether and may range in amount from 1 to 30 percent or higher of the weight of the cellulose ether. It is preferred, however, to use amounts not in excess of 5% when the equilibration is carried out at temperatures below −45° C.

The aqueous alkali used in contact with the membrane during the equilibration may be concentrated solution of the hydroxide of any alkali metal or of the hydroxide of organic ammonium cations. Examples are tetramethyl ammonium hydroxide, benzyl ammonium hydroxide, triethanol ammonium hydroxide, potassium hydroxide, sodium hydroxide, and the like. It is preferred to use the alkali which will be used in the cell or the cell fluid and in the same concentration as it is to be used in the cell. However, it is possible to equilibrate in alkali concentrations ranging from about 25 to 45%; although at 45% and higher the degree of electrolytic conductivity increase is not as great. Dependent upon the specific cellulose ether used, modified or unmodified, and specific hydroxide used, the lowest concentration of alkali utilizable depends upon the solubility of the membrane therein.

The equilibration is carried out at temperatures below about 10° C.; preferably at a temperature of a few degrees above the freezing point of the alkali solution used. This temperature in the case of 30% KOH is −55° to −60° C. Temperatures as low as −80° C. can be used, but with the lower temperatures there is required a longer equilibration time.

The equilibration is preferably carried out until the film is completely equilibrated in order to obtain the greatest electrolytic conductivity. This is ordinarily insured by a treatment period of six hours at a temperature about the freezing point of the alkali solution. If for some reason complete equilibration is not desired then, of course, shorter treatment times can be used. The treatment time for each desired conductivity is readily determined by testing the conductivity of the film at ambient temperature during the course of the treatment. By charting the conductivity, a plateau in the curve will be reached indicating maximum electrolytic conductivity. This treatment time is then utilized when equilibrating a film of identical composition using the same alkali and equilibration temperature. Thus, equilibration curves can be made for each set of conditions; i.e. type of film and alkali solution, and temperature, and used to equilibrate to the level desired.

The cellulose ether membrane, with or without a polar component, may be in the form of a film, button or other shape desired for a cell separator and is formed by any of the usual means, e.g. as by casting.

According to this invention, the membrane may be equilibrated in any form or in the form of an electrode wrap as for example in the form known in the cell as a U-wrap. The membrane may also enclose the electrode in the form of an envelope. In a preferred application of this invention, the electrochemical cell is first assembled with positive and negative electrodes properly separated by the membrane material. The assembled cell is filled with the chosen concentrated alkali solution and placed in a cold chamber maintained at the chosen temperature. After remaining at the cold temperature for a period of time sufficient to equilibrate the membrane material as noted, the cell is restored to room temperature and is ready for operation.

The invention will be further described in connection with the following examples which are set forth for the purpose of illustration only and wherein proportions are in parts by weight unless specifically stated to the contrary.

Example 1

100% methyl cellulose membranes of identical formulation and 1.5 mil thick, were placed into Pyrex bottles containing aqueous potassium hydroxide solution of concentration 30% by weight. One bottle was kept at room temperature, while the other was submerged in a Dry Ice-acetone bath which had a temperature in the range —53 to —57° C. over a period of 6 hours, and then restored to room temperature. At the end of these respective treatments the film which had been pre-cooled had absorbed 89% of potasium hydroxide solution, as compared to only 25% picked up by the film which was equilibrated directly at room temperature. Moreover, the pre-cooled film had a specific resistance of 50 ohms-cm. as compared with 498 ohms-cm. in the case of the film which had been equilibrated directly at room temperature.

The greater permeability of the pre-cooled film was evidenced also by measurement of the diffusion rate of silver ions through the membrane, using a radioactive silver isotope. Silver permeability was increased twentyfold by the pre-cooling treatment, but the actual rate of silver diffusion was still sufficiently low and did not interfere with the separator characteristics of the film in a silver-zinc or silver-cadmium cell. On the other hand, the metallic silver picked up the membranes during the diffusion test was negligible in the case of both films. The cold temperature equilibration increased the permeability of the membrane without changing its intrinsic stability to silver oxidation. The ten-fold reduction in specfic resistance was more than sufficient to meet the practical requirements of usefulness in an electrolytic cell.

Potassium hydroxide solution of 25%, 40% and 45% are used to equilibrate membranes not dissolvable therein and increased conductivity is obtained in each case with equilibration under cool conditions.

Example 2

A 100% methyl cellulose film was equlibrated in aqueous 30% potassium hydroxide solution at a temperature of —53° to —57° C. Its subsequent resistance at 25° C. was only 47 ohms-cm. After 90 days storage in the 30% potassium hydroxide solution at ambient temperature, the resistance was measured again and found to be 50 ohms-cm.

Example 3

An aqueous solution was prepared containing 6.7% methyl cellulose and 3.3% polyacrylic acid and adjusted to pH 4 by addition of potassium hydroxide. From this solution a clear homogeneous film was prepared by casting on glass. A portion of this film was allowed to equilibrate by standing in 30% potassium hydroxide solution for three days at 25° C. Another portion of the same film was equilibrated by being first pre-cooled at —58° C. in 30% potassium hydroxide solution, then allowed to stand for three days at 25° C. The specific resistance of the film which had not been pre-cooled was 26.4 ohms-cm. The pre-cooled film had a still lower resistance, 6.5 ohms-cm. and was permanently resistant to the oxidizing effect of the silver ions in silver-zinc alkaline batteries.

Example 4

A film was prepared by casting a solution containing 10.0% methyl cellulose and .90% potassium hydroxide. The film had a resistance of 74.6 ohms-cm. when equilibrated directly in 30% potassium hydroxide at 25° C. When this film was equilibrated at —53° to —57° C. in a 30% potassium hydroxide solution for 6 hours the film was greatly softened, but the resistance at 25° C. was lowered to only 1.6 ohms-cm.

Example 5

A 100% methyl cellulose film was first equilibrated in 30% potassium hydroxide solution for nineteen hours at ambient temperature and had a specific resistance of 498 ohms-cm. It was then contacted for six hours at —53° to —57° C. according to the procedure of Example 1. After being restored to room temperature, the film and supernatant liquid were stored at 25° C. for an extended period of time. After periods of 46, 68 and 134 days the specific resistance was measured to be 69, 50 and 66 ohms-cm. respectively. The almost ten-fold reduction in resistance was maintained. Thus, even when first equilibrated at ambient temperature the conductivity can be increased by the method of the present invention.

Example 6

A series of membrances are made using the films of Examples 1, 3, and 4 and the equilibration conditions thereof except that sodium hydroxide and tetramethyl ammonium hydroxide are each separately and in turn substituted in equal concentration for the potassium hydroxide. In each case increased conductivity is obtained with the pre-cooled membranes.

Example 7

A series of equilibrations are made using the process and membrane of Example 1, with the exception that the temperature of 10° C. and —80° C. are each separately and in turn used in place of the temperature used in Example 1. Membranes of increased conductivity result in each instance as compared to the equilibration at ambient temperatures.

Example 8

A series of membranes are made containing 95% methyl cellulose and 5% of one of the polar components listed hereinabove. The identical process of Example 1 is followed to equilibrate the membranes and with every membrane equilibrated under cool conditions increased conductivity is obtained as opposed to the same membrane equilibrated at ambient temperature.

Example 9

Suitable ethyl cellulose and propyl cellulose membranes are each separately and in turn substituted for the methyl cellulose membranes employed in Example 1. The equilibrations are conducted under the identical conditions set forth in Example 1 and the equilibrated membranes obtained using the cold temperatures have a much greater conductivity than the membranes equilibrated at ambient temperatures.

Membranes of the instant invention have an electrolytic conductivity 4 to 12 times higher than identical films equilibrated under identical conditions save that the temperature of treatment was at or about ambient temperature. It will be understood that the resistance of the films as set forth in the examples herein is the reciprocal of the conductivity; the lower the resistance the higher the conductivity.

While the instant invention has particular application to alkaline silver batteries such as silver-zinc and silver-cadmium, it is also applicable to other alkaline batteries; such as nickel-cadmium, when increased conductivity is desired.

It will be understood that it is intended to cover all changes and modifications of the examples of the invention herein chosen for the purpose of illustration which do not constitute departures from the spirit and scope of the invention.

What is claimed is:

1. The process of increasing the ambient-temperature electrolytic conductivity of a cellulose ether membrane which process comprises exposing said membrane to a temperature below about 10° C. by contacting said membrane with a concentrated aqueous alkali solution containing between about 25 and about 45% by weight of an alkali metal hydroxide maintained at a temperature of below about 10° C. until the said membrane is essentially equilibrated, and subsequently exposing said membrane to ambient temperature.

2. An electrochemical cell comprising electrodes and an aqueous alkali fluid, said cell having interposed between the electrodes an equilibrated cellulose ether membrane prepared by the process of claim 1.

3. A process of making a battery cell for use at ambient temperature which process includes the steps of (a) conditioning a cellulosic ether membrane in connect with a concentrated aqueous alkali at a temperature of below about 10° C. until substantially constant conductivity is reached, said alkali being sufficiently concentrated so as substantially not to dissolve said membrane therein at the selected conditioning temperature, (b) interposing the conditioned membrane between the electrodes of a battery cell and (c) filling the cell with a concentrated aqueous alkali.

4. A process of making a battery cell for use at ambient temperature which process includes the steps of (a) interposing between the electrodes of said cell a membrane comprising a cellulosic ether, (b) filling the cell with a concentrated aqueous alkali and (c) equilibrating the assembly at a conditioning temperature of below about 10° C. until substantially constant conductivity is reached, said alkali being sufficiently concentrated so as substantially not to dissolve said membrane therein at the selected conditioning temperature.

5. The process of claim 3 wherein the concentrated aqueous alkali is 25–45% potassium hydroxide and the equilibration is conducted at a temperature above the freezing point of the aqueous alkali but below about 10° C.

6. The process of claim 4 wherein the concentrated aqueous alkali is 25–45% potassium hydroxide and the equilibration is conducted at a temperature above the freezing point of the aqueous alkali but below about 10° C.

7. The process of claim 5 wherein the cellulose ether is methyl cellulose.

8. The process of claim 6 wherein the cellulose ether is methyl cellulose.

9. The process of claim 7 wherein the degree of substitution of the methyl cellulose is in the range of 1.6–1.9.

10. The process of claim 8 wherein the degree of substitution of the methyl cellulose is in the range 1.6–1.9.

References Cited

UNITED STATES PATENTS

| 2,296,856 | 9/1942 | Lilienfeld | 264—195 |
| 2,419,341 | 4/1947 | Edelstein | 106—197 XR |
| 2,447,757 | 8/1948 | Lilienfeld | 106—197 |
| 2,696,515 | 12/1954 | Koren et al. | 136—154 XR |
| 3,245,839 | 4/1966 | Rosser et al. | 136—146 |

WINSTON A. DOUGLAS, Primary Examiner

D. L. WALTON, Assistant Examiner

U.S. Cl. X.R.

264—195, 340; 106—197; 260—232